US010720269B2

(12) United States Patent
Huber et al.

(10) Patent No.: US 10,720,269 B2
(45) Date of Patent: Jul. 21, 2020

(54) SUPERPARAMAGNETIC NANOPARTICLES AND NANOCOMPOSITES

(71) Applicant: National Technology & Engineering Solutions of Sandia, LLC, Albuquerque, NM (US)

(72) Inventors: Dale L. Huber, Albuquerque, NM (US); John Daniel Watt, Albuquerque, NM (US); Jessica Anne Bierner, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 264 days.

(21) Appl. No.: 15/899,043

(22) Filed: Feb. 19, 2018

(65) Prior Publication Data

US 2019/0259515 A1 Aug. 22, 2019

(51) Int. Cl.
*H01F 1/00* (2006.01)
*C08G 59/32* (2006.01)
*C08K 3/08* (2006.01)

(52) U.S. Cl.
CPC ....... *H01F 1/0018* (2013.01); *C08G 59/3218* (2013.01); *C08K 3/08* (2013.01); *C08K 2003/0856* (2013.01); *C08K 2201/01* (2013.01); *C08K 2201/011* (2013.01)

(58) Field of Classification Search
CPC .................................................. H01F 1/0018
See application file for complete search history.

(56) References Cited

U.S. PATENT DOCUMENTS 7,972,410 B1   7/2011   Huber

OTHER PUBLICATIONS

Dach, B.I. et al., "Cross-Linked "Matrix-Free" Nanocomposites from Reactive Polymer-Silica Hybrid Nanoparticles", Macromolecules, 43 (2010), pp. 6549-6552.
Dong, W. et al., "Facile Synthesis of Monodisperse Superparamagnetic Fe3O, 4 Core@hybrid@Au Shell Nanocomposite for Bimodal Imaging and Photothermal Therapy", Adv. Mater. 23 (2011), pp. 5392-5397.
Gu, W. et al., "Stabilized, Superparamagnetic Functionalized Graphene/Fe3O4@Au Nanocomposites for a Magnetically-Controlled Solid-State Electrochemiluminescence Biosensing Application", Anal. Chem. 87 (2015), pp. 1876-1881.
Huber, D.L., "Synthesis, Properties, and Applications of Iron Nanoparticles", Small 1 (2005), No. 5, pp. 482-501.

(Continued)

*Primary Examiner* — C Melissa Koslow
(74) *Attorney, Agent, or Firm* — Kevin W. Bieg (57) ABSTRACT

The present invention is directed to the syntheses of superparamagnetic nanoparticles and the incorporation of the nanoparticles as the magnetic component to form a strongly magnetic nanocomposite. The superparamagnetic nanoparticles possess no hysteresis and are too small to support eddy currents. The invention uses a ligand exchange procedure to produce aminated nanoparticles that are then cross-linked using epoxy chemistry. The result is a magnetic nanoparticle component that is covalently linked and well separated. By using this 'matrix-free' approach, it is possible to substantially increase the magnetic nanoparticle fraction, while still maintaining good separation, leading to a superparamagnetic nanocomposite with strong magnetic properties and low magnetic losses.

9 Claims, 7 Drawing Sheets

(56) References Cited

OTHER PUBLICATIONS

Mandel, K. et al., "Modified Superparamagnetic Nanocomposite Microparticles for Highly Selective HgII or CuII Separation and Recovery from Aqueous Solutions", ACS Appl. Mater. Interfaces 4 (2012), pp. 5633-5642.
Mochalin, V.N. et al., "Covalent Incorporation of Aminated Nanodiamond into an Epoxy Polymer Network", ACS Nano, vol. 5, No. 9 (2011), pp. 7494-7502.
Naughton, B.T. et al., "Magnetic Properties of Nickel-Zinc Ferrite Toroids Prepared from Nanoparticles", J. Am. Ceram. Soc., 90, [11] (2007), pp. 3547-3553.
Pour, Z.S. and Ghaemy, M., "Thermo-mechanical behaviors of epoxy resins reinforced with silane-epoxide functionalized [alpha]-$Fe_2O_3$ nanoparticles", Progress in Organic Coatings 77 (2014), pp. 1316-1324.
Watt, J. et al., "Non-volatile iron carbonyls as versatile precursors for the synthesis of iron-containing nanoparticles", Nanoscale, 9 (2017), pp. 6632-6637.
Xu, Y. et al., "Water-Soluble Iron Oxide Nanoparticles with High Stability and Selective Surface Functionality", Langmuir 27 (2011), pp. 8990-8997.
Zhu, J. et al., "Magnetic Epoxy Resin Nanocomposites Reinforced with Core-Shell Structured Fe@FeO Nanoparticles: Fabrication and Property Analysis", ACS Applied Materials & Interfaces, vol. 2, No. 7 (2010), pp. 2100-2107.
Zhu, L. et al., "Multifunctional pH-sensitive superparamagnetic iron-oxide nanocomposites for targeted drug delivery and MR imaging", Journal of Controlled Release 169 (2013), pp. 228-238.

SUPERPARAMAGNETIC NANOPARTICLES AND NANOCOMPOSITES

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to magnetic materials and, in particular, to a method to synthesize superparamagnetic nanoparticles that can be used to form a superparamagnetic nanocomposite.

BACKGROUND OF THE INVENTION

Recent developments in wide-bandgap power electronics have led to significant improvements in the power to size ratio. However, the passive magnetic components have shown less significant changes in recent years, and now represent a disproportionate amount of space and weight in the system. This has become a pressing issue for modern applications, e.g., small sizes and high switching frequencies are needed for notebook computers. See M. Koeda et al., *Electr. Commun. Jpn.* 96, 46 (2013). Furthermore, reduction in power consumption and enhancing overall efficiencies has become more imperative as the drive for a low-carbon economy continues. Rapid advancement in soft magnetic materials for the next generation of power electronics is therefore sorely needed. Currently, carbonyl iron and associated ferrites are used extensively as powder cores for inductor applications in high-power circuits. However, these are characterized by losses from remanent magnetization and eddy current formation, effects that are particularly evident at high switching frequencies. More highly desired magnetic properties include high saturation magnetization and permeability, low conductivity (to avoid eddy current losses), and low magnetic hysteresis. Ultimately, the goal is to combine high magnetic saturation, $M_{sat}$, with a nearly flat permeability response from DC up to several MHz, performance superior in terms of permeability and loss behavior to that offered by soft ferrites. See C. Beatrice et al., *J. Magn. Magn. Mater.* 420, 317 (2016).

All of these design criteria can be met by an appropriately designed soft magnetic material, which avoids the common sources of loss. Superparamagnetic nanoparticles are a class of material that have seen intense research interest in fields including drug delivery, bimodal imaging, biosensing, and heavy metals recovery. See K. Mandel et al., *ACS Appl. Mater. Interfaces* 4, 5633 (2012); W. J. Dong et al., *Adv. Mater.* 23, 5392 (2011); W. L. Gu et al., *Anal. Chem.* 87, 1876 (2015); and L. J. Zhu et al., *J. Controlled Release* 169, 228 (2013). Superparamagnetism is a phenomenon that occurs in single domain particles, where the collective behavior of atomic spins leads to a giant vector spin that can randomly orient with sufficient thermal energy, leading to a net zero magnetization for the particle ensemble. Superparamagnets are defined by an absence of magnetic hysteresis, which makes them especially suitable for high frequency switching applications. The size of the particle required for superparamagnetism to emerge is also relatively small, which eliminates the contribution from eddy current loss, as the nanoparticles themselves are too small to support eddy currents. Therefore, superparamagnetic nanoparticles, in theory, should completely remove the two major sources of loss when compared to conventional core materials.

A strong candidate for effective application are iron nanoparticles. Iron is low-cost, being the fourth most abundant element, and is non-toxic. It possesses the highest room temperature $M_{sat}$ of any element (218 $Am^2/kg$@293 K), while also possessing a very low magnetocrystalline anisotropy, meaning superparamagnetism can be observed at larger nanoparticle sizes. See B. Cullity, *Introduction to Magnetic Materials*, Addison-Wesley Pub. Co., Reading, Massachusetts (1972). This is important when optimizing the material's $M_{sat}$ as magnetization reduces with decreasing nanoparticle size. This is typically due to the formation of magnetically inert layers at the surface arising from spin-glass formation, or from surface electronic effects. See D. L. Huber, *Small* 1, 482 (2005).

In order to take advantage of superparamagnetic iron nanoparticles in core applications, it is necessary to separate the particles and prevent magnetic interaction. For example, magnetic dipole-dipole interactions can introduce hysteresis into a superparamagnetic ensemble. See M. Knobel et al., *J. Nanosci. Nanotechnol.* 8, 2836 (2008). Separation has previously been achieved by the formation of a polymer nanocomposite, in which the nanoparticles are suspended in a polymer matrix. See J. Pyun, *Polymer Reviews* 47, 231 (2007). Polymer nanocomposites have attracted significant research interest due to facile formation, light weight, and low cost of the matrix fraction. Furthermore, the plethora of different polymer and nanoparticle species available allows for the design of materials with tunable mechanical, magnetic, optical, and electrical properties. See H. Wakayama and H. Yonekura, *Mater. Lett.* 171, 268 (2016). This has led to a number of useful applications for nanocomposites including sensor applications, as conducting membranes for fuel cells, and as fire retardants. See J. Pyun, *Polymer Reviews* 47, 231 (2007). Polymeric nanocomposites can also be applied relatively easily to molds and also see promise in additive manufacturing. See A. C. de Leon et al., *React. Funct. Polym.* 103, 141 (2016). The real promise of nanocomposites however lies in their multi-functionality and the possibility of realizing unique combinations of properties unachievable with traditional, bulk materials. The inherent challenges in their formation include control over the distribution in size and dispersion of the nanostructured constituents, as well as tailoring and understanding the role of interfaces on the emerging bulk properties. Phase separation is also a well-established concern, which for a magnetic nanocomposite would eliminate the benefits of superparamagnetism due to the formation of ferromagnetic domains. See J. B. Hooper and K. S. Schweizer, *Macromolecules* 39, 5133 (2006). By their nature however, polymers have very large molecular weights, and are typically benign in terms of functionality. This means that in a nanocomposite the functional component becomes the minority fraction, which limits performance. Increasing this fraction to achieve high nanoparticle loadings, while still possessing control over the interparticle spacing and magnetic interactions would significantly increase the performance and applicability of nanocomposites.

Recently, a supramolecular building block approach has been suggested for the preparation of a new family of nanocomposites. These nanocomposites are comprised of nanoparticles cross-linked by covalently bound organic bridges, eliminating the need for a polymer matrix. See V. N. Mochalin et al., *Acs Nano* 5, 7494 (2011); and B. I. Dach et al., *Macromolecules* 43, 6549 (2010). The nanoparticles are separated by the surfactant molecules bound to their surfaces, which are covalently bound to neighboring nanoparticles through their corresponding surfactant molecules. In doing so, a "matrix-free" nanocomposite is formed. These nanocomposites are not prone to the nanoparticle aggregation effects that plague conventional nanocomposites, and provide exceptionally high strength and toughness. See V. N. Mochalin et al., *Acs Nano* 5, 7494 (2011).

A promising approach to forming matrix-free nanocomposites is by employing epoxy chemistries, as this is well-known to provide strong mechanical properties in a cross-linked environment. Epoxy resins are a class of thermosetting polymers that are ubiquitous as coatings, adhesives, and in structural repair and are recently seeing application in additive manufacturing applications. See B. G. Compton and J. A. Lewis, *Adv. Mater.* 26, 5930 (2014); and F. L. Jin et al., *J. Ind. Eng. Chem.* 29, 1 (2015). They have also been used on numerous occasions to form traditional nanocomposite materials. Carbonyl iron-epoxy magnetic cores have recently been used by Sugawa for large-current inductors mounted directly onto a chip. See Y. Sugawa et al., *IEEE T. Magn.* 49, 4172 (2013). They showed that good dispersion within the epoxy matrix leads to lower losses at high frequencies, due to less large magnetic agglomerates present in the system. Gu surface functionalized magnetite nanoparticles with conductive polyaniline to increase the epoxy-nanoparticle interaction and strengthen the nanocomposite mechanical properties. See H. Gu et al., *ACS Appl. Mater. Interfaces* 4, 5613 (2012). Incorporation of the functionalized nanoparticles led to better thermal stability as well as increased dispersion of magnetic fraction. Zhu formed magnetic epoxy nanocomposites with Fe@FeO core-shell nanoparticles. See J. H. Zhu et al., *ACS Appl. Mater. Inter.* 2, 2100 (2010). They used a commercially available epoxy system and formed nanocomposites with nanoparticle packing fractions of between 1 and 20 wt. %. They measured an $M_{sat}$ of 108 $Am^2/kg$ for the Fe@FeO nanoparticles themselves, which was reduced to 17 $Am^2/kg$ when incorporated into the epoxy network. Pour also showed improved mechanical properties when incorporating surface modified maghemite $\alpha$-$Fe_2O_3$ nanoparticles into a diglycidyl ether of bisphenol-A (DGEBA)-based epoxy matrix. See Z. S. Pour and M. Ghaemy, *Prog. Org. Coat.* 77, 1316 (2014). This was due to improved nanoparticle dispersion, and increased interfacial adhesion between the DGEBA and $\alpha$-$Fe_2O_3$. However, maximum nanoparticle loading was only 11 wt %. While providing good examples of the usefulness an epoxy network in the formation of nanocomposites, these approaches mimicked the use of polymers in that the nanoparticles were embedded in an epoxy matrix.

In terms of the nanoparticle fraction, control over the size and shape is essential to produce an effective superparamagnetic nanocomposite. For example, a finite size distribution leads to a distribution in relaxation times, which can adversely affect performance in high frequency switching applications. See B. T. Naughton et al., *J. Am. Ceram. Soc.* 90, 3547 (2007). When considering shape, any deviation from an ideal sphere can introduce higher-order multipole terms in the magnetic dipole interaction energy, leading to deviations from the expected magnetic behavior. See N. Mikuszeit et al., *J. Phys. Condens. Mat.* 16, 9037 (2004). Controlling interparticle spacing is imperative; too close and interparticle interactions can lead to hysteresis and losses, too far and porosity can reduce the maximum achievable magnetic fraction; reducing the overall $M_{sat}$ of the nanocomposite. See B. T. Naughton et al., *J. Am. Ceram. Soc.* 90, 3547 (2007). Finally, the magnetic nanoparticles employed in the formation of the nanocomposite must be synthesized in sufficiently large quantities. This is especially important when considering application of the nanocomposite in inductor and transformer technologies, where the form-factor for testing can vary significantly.

SUMMARY OF THE INVENTION

The present invention is directed to the synthesis of superparamagnetic nanoparticles in a predictable and reproducible manner. The nanoparticles have high saturation magnetizations and are superparamagnetic at room temperature, thereby addressing the two major requirements for magnetic components in power electronics. The nanoparticles can be subjected to a ligand exchange procedure in-situ, which replaces the growth directing surfactants with an amine ligand comprising two or more amine groups. The resulting aminated nanoparticles can then react with an epoxy comprising two of more epoxide groups, leading to a covalently bound cross-linked network between the nanoparticle fraction. By using this matrix-free approach the organic fraction of the nanocomposite can be significantly reduced. In one example, 62 wt % loading of $Fe/Fe_xO_y$ core-shell nanoparticles was achieved. The nanocomposite is superparamagnetic at room temperature and has a large saturation magnetization. The magnetic fraction is well separated in the nanocomposite. The resulting superparamagnetic nanocomposite can therefore be used as a core material for inductor and transformer technologies.

BRIEF DESCRIPTION OF THE DRAWINGS

The detailed description will refer to the following drawings, wherein like elements are referred to by like numbers.

FIGS. 4(a) and (b) show magnetic characterization of the 15.2 nm±1.2 nm $Fe/Fe_xO_y$ core-shell nanoparticles performed using a vibrating sample magnetometer (VSM).

DETAILED DESCRIPTION OF THE INVENTION

Figure 1:
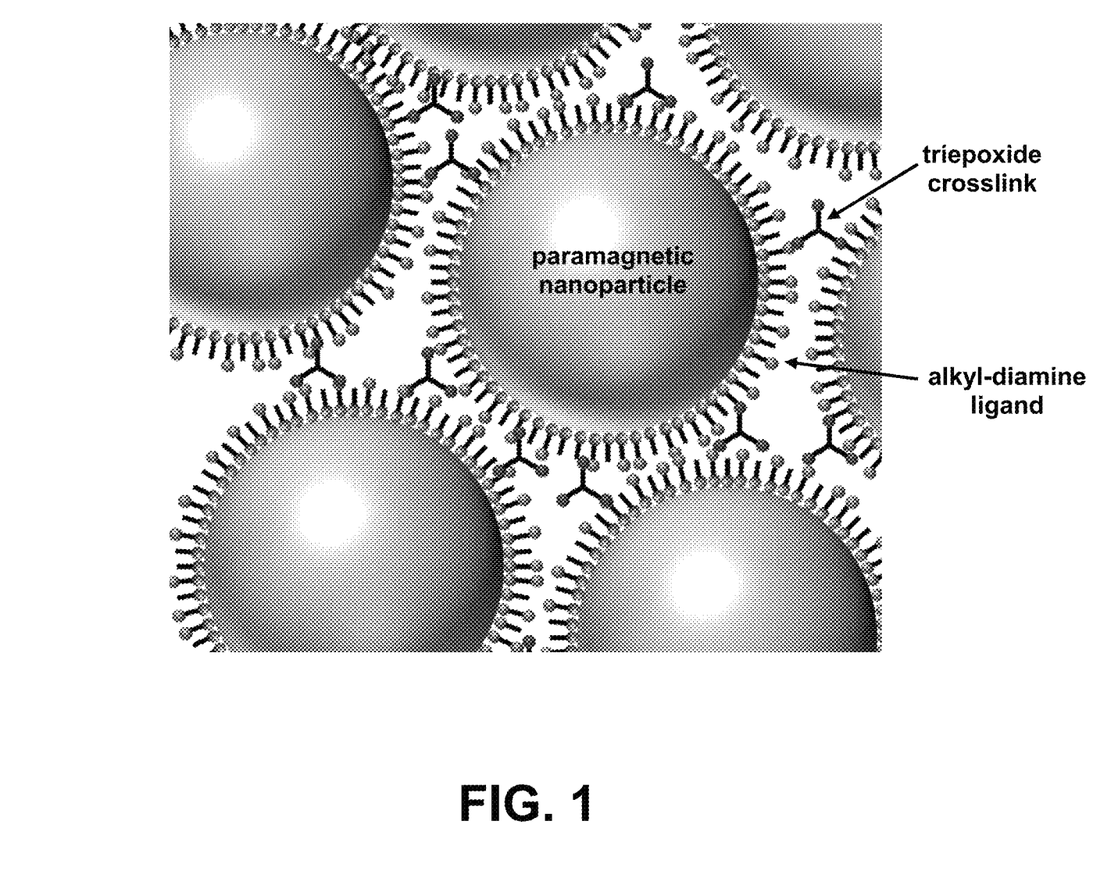
FIG. 1 is a schematic illustration of an as-synthesized matrix-free superparamagnetic nanocomposite. The interparticle distance can then be tuned easily by varying the alkyl chain length of the diamine.

The present invention is directed to the syntheses of strongly paramagnetic nanoparticles and their use as the magnetic fraction in the formation of a matrix-free superparamagnetic nanocomposite. FIG. 1 shows a schematic illustration of the matrix-free superparamagnetic nanocomposite. The nanoparticles can be synthesized using a reversible agglomeration mechanism, which is scalable and yields a magnetic nanoparticle ensemble with good shape control and tight size distribution. See D. L. Huber, U.S. Pat. No. 7,972,410 (2011), which is incorporated herein by reference. A ligand-exchange procedure can then be performed in-situ, replacing the growth directing surfactants with a diamine or higher order amine ligand, thereby expressing an amine functionality into the environment. This can then be cross-linked with an epoxy comprising at least two epoxide groups to yield a matrix-free nanocomposite. By covalently linking the magnetic nanoparticles together with a cured epoxy network the organic fraction can be significantly reduced to achieve high nanoparticle loadings. The nanocomposite has a well separated nanoparticle fraction, enabling a nanocomposite with strong magnetic properties.

Synthesis of Superparamagnetic Nanoparticles

As described above, iron nanoparticles are a good candidate for the superparamagnetic nanocomposite, and iron has the highest room temperature saturation magnetization and a low magnetocrystalline anisotropy. However, other magnetic nanoparticles, such as cobalt, nickel, and alloys thereof, can also be used. As an example, Fe/Fe$_x$O$_y$ core-shell nanoparticles can be formed via solvothermal synthesis using trioctylphosphine (TOP) and oleylamine (OLA) as surfactants, with 1-octadecene (1-ODE) as the high boiling point solvent. Solvothermal synthesis is known to give significantly better control over the synthesis of iron nanoparticles when compared to other techniques, e.g., reduction of iron salts. See D. L. Huber, *Small* 1, 482 (2005). Magnetic nanoparticles with a uniformly spherical shape and a very tight size distribution can be formed reproducibly and predictably in an Extended LaMer synthesis. See E. C. Vreeland et al., *Chem. Mater.* 27, 6059 (2015). Here, continuous addition of the reaction precursor leads to a steady state growth regime which eliminates Ostwald ripening, a known source of polydispersity. This method was extended to strongly magnetic zero-valent iron nanoparticles, in what has been named the reversible agglomeration mechanism. See D. L. Huber, U. S. Pat. No. 7,972,410 (2011). In this approach, magnetic nanoparticles nucleate and grow until a critical susceptibility is reached. At this point, magnetic dipole interactions overcome dispersive forces leading to magnetic agglomeration. This is followed by precipitation of the agglomerated nanoparticles and a phase change in the system, an example of true thermodynamic reaction control in nanoparticle synthesis. As the onset of agglomeration is directly a result of an increase in particle susceptibility, nanoparticle growth is arrested within a very small size window, yielding a strongly magnetic nanoparticle ensemble with a tight size distribution. With the continued addition of precursor a second nucleation event can then occur, leading to subsequent growth and a second agglomeration/precipitation event. By continuously adding precursor, multiple reversible agglomeration steps can be performed indefinitely, meaning the mechanism is unique in its scalability. This is an important aspect of this synthetic approach, since for effective application of a useful nanocomposite, greater than typical lab-scale quantities need to be produced. The nanoparticle product can then be resuspended in most common organic solvents through the addition of energy, e.g., heat or sonication, confirming the reversibility of the mechanism. In the synthesis of iron nanoparticles, solvents and reagents are typically dried and degassed to remove oxygen and avoid oxidation. This is reasonable for research scale quantities, however when dealing with the larger quantities required for scale up this can become impractical. Therefore, the following nanoparticle products were all formed using the solvents and reagents as received directly from the supplier.

As an example of the invention, Fe/Fe$_x$O$_y$ nanoparticles were synthesized using the reversible agglomeration mechanism. To form 1 gm of nanoparticles, a three-necked reaction flask was charged with 16 mL 1-octadecene (1-ODE), 2 mL oleylamine (OLA) (6 mmol), and 2.7 mL trioctylphosphine (TOP) (6 mmol). This was transferred to an air free Schlenck line under a nitrogen atmosphere and heated to 250° C. with stirring at 300 rpm, using a magnetic stir bar. The reaction solution was prepared by diluting 5 mL iron pentacarbonyl (Fe(CO)$_5$) (37 mmol) in 15 mL 1-ODE. The reaction solution was injected into the reaction flask at a rate of 100 µL/min via a syringe pump. The reaction was reacted for a further 30 min at 250° C., following the completion of the drip. The reaction was then cooled to room temperature and the product was isolated from the magnetic stir bar and resuspended in 1-ODE. The surface was allowed to oxidize passively, leading to Fe/Fe$_x$O$_y$ core-shell nanoparticles.

Figure 2A:
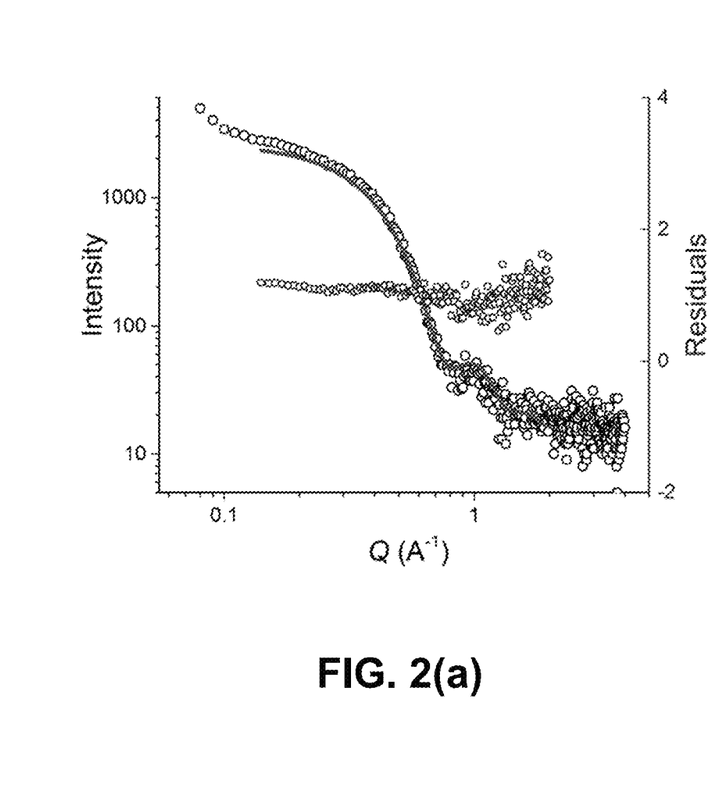
FIG. 2(a) is an ensemble small angle X-ray scattering (SAXS) analysis performed on an aliquot of $Fe/Fe_xO_y$ core-shell nanoparticles measured an average diameter of 15.2 nm±1.2 nm.
Figure 2B:
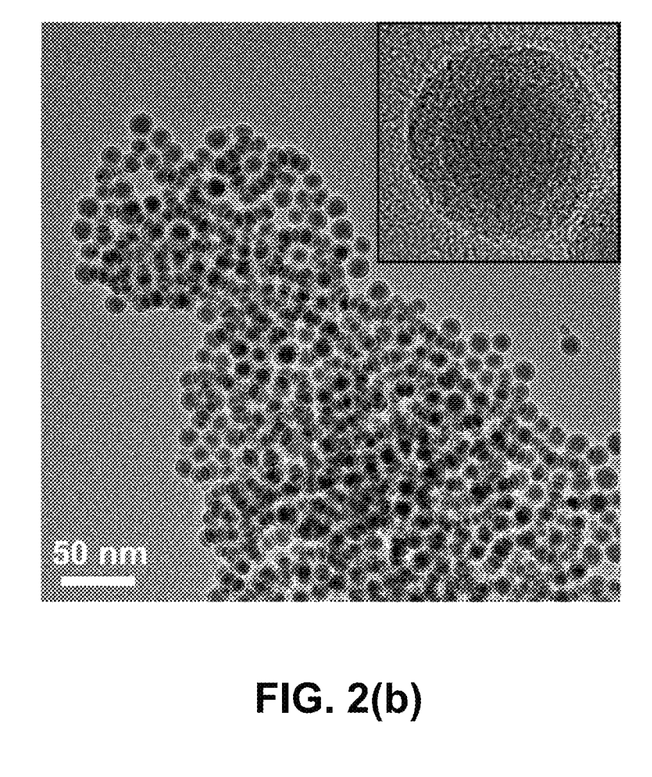
FIG. 2(b) shows a corresponding transmission electron microscopy (TEM) image. (inset) High-resolution TEM image showing partial surface oxidation has occurred during the sample preparation step.

The results of the synthesis of superparamagnetic nanoparticles are shown in FIGS. 2(a)-(b). The Fe/Fe$_x$O$_y$ core-shell nanoparticles synthesized using the reversible agglomeration mechanism can be separated from solution by the application of an external magnetic field. Ensemble small angle X-ray scattering (SAXS) size analysis is given in FIG. 2(a), showing the raw data overlaid with the model fit and corresponding residuals. The model was applied assuming a spherical shape and Gaussian size distribution, as observed in transmission electron microscopy (TEM), as shown in FIG. 2(b). SAXS gave an average size of 15.2 nm±1.2 nm, for the nanoparticle ensemble. TEM analysis showed the nanoparticles to be uniformly spherical, with a 2.5 nm thick iron oxide shell which forms after the nanoparticle product is exposed to air post-synthesis (inset of FIG. 2(b)).

Figure 3A:
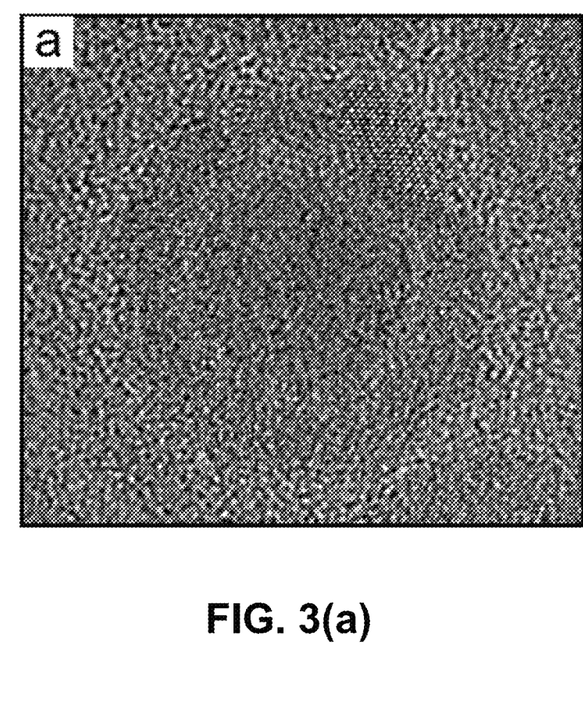
FIG. 3(a) is a high-resolution transmission electron microscopy (HRTEM) image of a $Fe/Fe_xO_y$ core-shell nanoparticle.
Figure 3B:
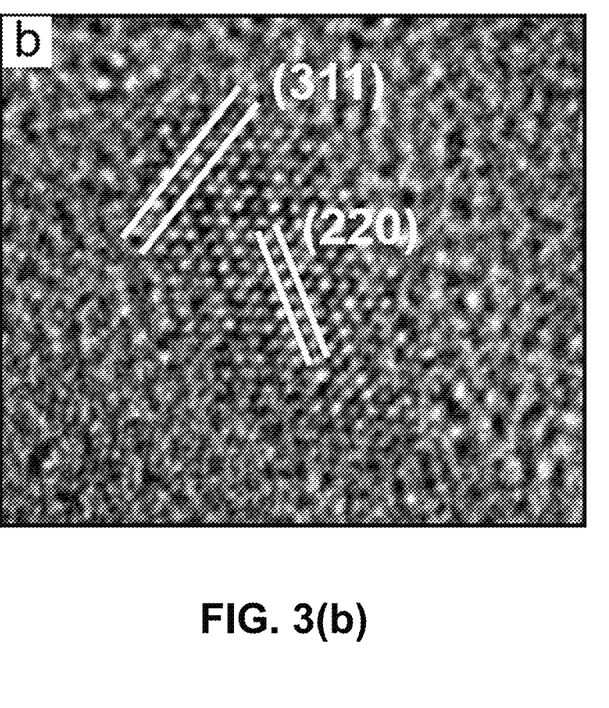
FIG. 3(b) is a high magnification image of the iron oxide shell. The lattice spacings can be indexed to the (311) and (220) planes characteristic of either magnetite ($Fe_3O_4$) or maghemite ($\gamma$-$Fe_2O_3$).

FIG. 3(a) is a high-resolution transmission electron microscopy (HRTEM) of a Fe/Fe$_x$O$_y$ core-shell nanoparticle. FIG. 3(b) is a high magnification image of the iron oxide shell. The lattice spacings can be indexed to the (311) and (220) planes of the cubic spinel phase, characteristic of either magnetite (Fe₃O₄) or maghemite (γ-Fe₂O₃). Unfortunately, TEM alone is not able to distinguish between the two phases.

Figure 4A:
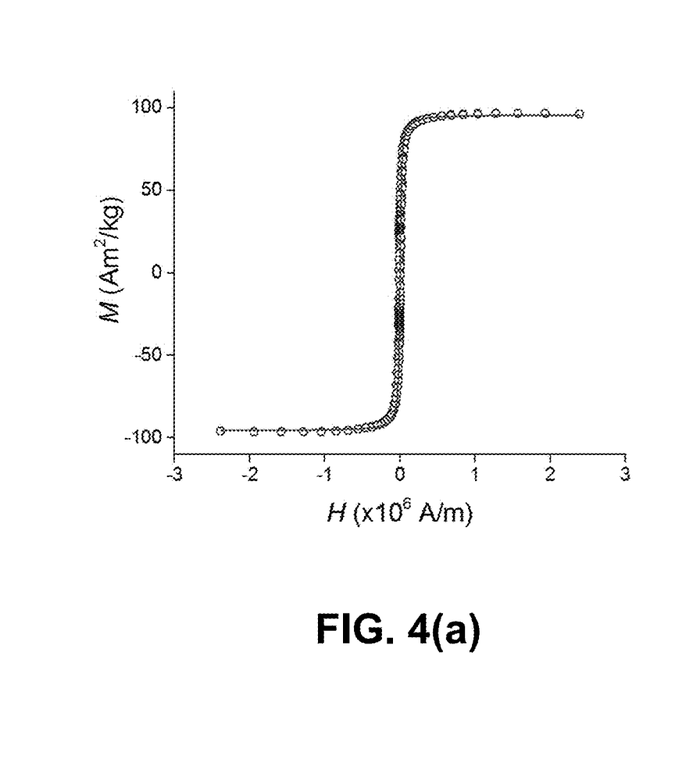
FIG. 4(a) is a magnetic moment vs field plot, showing the nanoparticles have a saturation magnetization, $M_{sat}$, of 96 $Am^2/kg$ at 50 K. The $M_{sat}$ curve was fit using the Langevin equation, indicating the nanoparticles had a magnetic diameter of 10.2 nm.
Figure 4B:
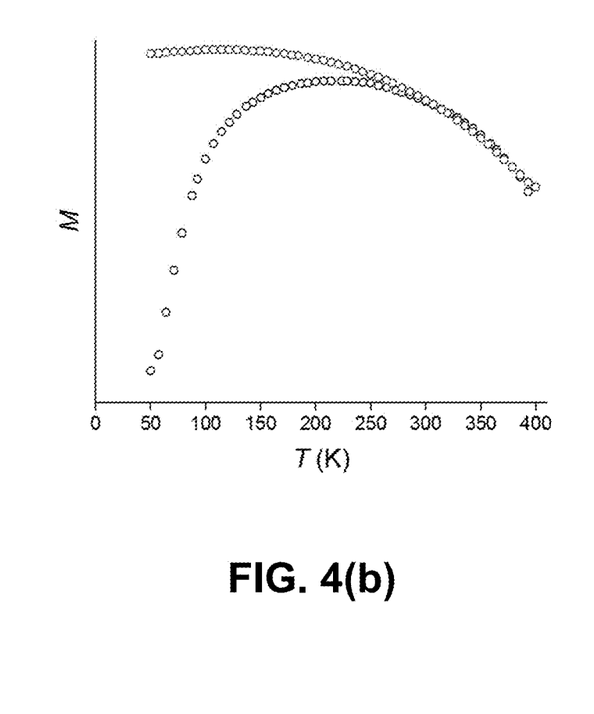
FIG. 4(b) is a zero-field cooled-field cooled (ZFC-FC) plot showing a blocking temperature of 233 K, which indicates the nanoparticles are superparamagnetic at room temperature.

The magnetic properties of the 15.2 nm±1.2 nm Fe/Fe$_x$O$_y$ core-shell nanoparticles were then investigated using vibrating sample magnetometry (VSM). As shown in FIG. 4(a), saturation magnetization, M$_{sat}$, of the nanoparticles was measured to be 96 Am²/kg at 50 K. This is larger than the value expected for magnetite (92 Am²/kg) or maghemite (76 Am²/kg), indicating the presence of a zero-valent iron (Fe(o)) core. The M$_{sat}$ curve was then fit using the Langevin equation, as shown in FIG. 4(a). The fit gave a magnetic diameter of 10.2 nm, which is consistent with what is observed for the zero-valent iron core observed in TEM. See M. Unni et al., *ACS Nano* 11, 2284 (2017). HRTEM did not observe lattice spacings of the iron core characteristic of the bcc crystal structure of α-Fe, indicating the nanoparticles possess either an amorphous core, or a distorted lattice, both of which are known to reduce M$_{sat}$ when compared to α-Fe. See T. C. Monson et al., *Part. Part. Syst. Charact.* 30, 258 (2013). An additional factor reducing the M$_{sat}$ may be the strong iron-phosphine interaction that can introduce a magnetically dead layer at the surface. See D. L. Huber et al., *Small* 1, 482 (2005). Zero-field cooled, field cooled (ZFC-FC) experiments were performed to identify the blocking temperature, T$_B$, and the corresponding onset of superparamagnetism, as shown in FIG. 4(b). The peak is relatively broad and centered with a T$_B$ of 233 K, which is significantly reduced when compared to zero-valent iron nanoparticles of a similar size, due to the presence of an oxide shell. See J. Watt et al., *Nanoscale* 9, 6632 (2017). Here, oxidation is beneficial as it ensures that the nanoparticles are superparamagnetic at room temperature. The broadness of the peak indicates there may be some interparticle interactions occurring in the nanoparticle ensemble, which is a reasonable assumption as the product is measured as an agglomerated magnetic pellet, as is produced from the reversible agglomeration mechanism.

The reversible agglomeration mechanism is characterized by the nucleation and growth of nanoparticles followed by agglomeration and renucleation steps, a cycle that can be repeated indefinitely to reach large scale synthesis. Therefore, to calculate the number of reversible agglomeration cycles needed to synthesize 1 g of Fe/Fe$_x$O$_y$ nanoparticles, the critical nuclei radius at the reaction temperature of 523 K was first determined. The critical nuclei radius is defined by:

$$r_c = -\frac{2\gamma}{G_V}$$

where γ is the surface free energy of iron, which at 523 K is equal to 2.3 J/m². See J. Park et al., *Angew. Chem. Int. Ed. Engl.* 46, 4630 (2007); S. Schonecker et al., *Sci. Rep.* 5, 14860 (2015); and G. Grochola et al., *J. Chem. Phys.* 120, 3425 (2004). G$_v$ is the Gibbs energy per volume of iron, which in the molten state of Fe(0) nuclei at high temperatures is equal to $-1.57 \times 10^9$ J/m³. See J. Park et al., *Angew. Chem. Int. Ed. Engl.* 46, 4630 (2007). In the reducing environment created by the decomposition of Fe(CO)₅ and the production of CO gas, the nuclei can be assumed to be truly zero-valent iron. Therefore, the critical nuclei radius for Fe(0) at 523 K is 2.93 nm. If it assumed that the first drop of precursor nucleates and all iron is consumed by surviving nuclei, then how much additional precursor is needed to grow the nanoparticles to their maximum size, before agglomeration occurs, can be calculated. Each individual drop has a volume of ~10 μL. See G. K. Tripp et al., *Vet. Ophthalmol.* 19, 38 (2016). Therefore, as a 3:1 ODE:Fe (CO)₅ precursor mixture is introduced, each drop contains 2.5 μL of Fe(CO)₅, which equates to 1.06 mg of Fe(0). Taking a nuclei size of 2.93 nm and a density of 7874 kg/m³, each drop contains $1.28 \times 10^{15}$ nuclei. Then, for the 1 g reaction, the maximum size before agglomeration is 15.2 nm. Each maximum-sized nanoparticle is therefore calculated to have a mass of $1.45 \times 10^{-20}$ kg. If each of the $1.28 \times 10^{15}$ nuclei grows to this maximum size, then one reversible agglomeration cycle consumes $1.85 \times 10^{-5}$ kg, or 0.0185 g, of Fe(0). Taking the above assumptions, and knowing that the final mass of Fe(0) nanoparticles formed is 1 g, a minimum of 54 cycles of reversible magnetic agglomeration is calculated to have occurred.

The reversible agglomeration mechanism was scaled up by an order of magnitude, to 10 g. At this large scale, a peristaltic pump was needed to deliver sufficient quantities of Fe(CO)₅ precursor solution to the reaction flask. Likewise, the size of the reaction flask dictates that magnetic stirring is not sufficient, and an overhead stirring setup was required. This introduces challenges with controlling an air-free environment, however this was achieved by maintaining a positive pressure of flowing nitrogen throughout the reaction. Specific Tygon tubing was chosen with low gas permeability and high chemical resistance, to protect against premature decomposition of the Fe(CO)₅. To form 10 gm of nanoparticles, a three-necked reaction flask was charged with 80 mL 1-ODE, 10 mL OLA (30 mmol), and 13.6 mL TOP (30 mmol). This was transferred to an air free Schlenck line under a nitrogen atmosphere and heated to 240° C. with stirring at 300 rpm using an overhead stirrer. The reaction solution was prepared by diluting 25 mL Fe(CO)₅ (185 mmol) in 75 mL 1-ODE. The reaction solution was injected into the reaction flask at a rate of 0.33 mL/min using a peristaltic pump. The reaction was reacted for a further for 30 min at 240° C., following the completion of the drip. The reaction was then cooled to room temperature and the product was isolated and resuspended in 1-ODE. The surface was allowed to oxidize passively, leading to Fe/Fe$_x$O$_y$ core-shell nanoparticles.

SAXS analysis gave an average diameter of 13.7 nm±2.5 nm for this nanoparticle ensemble. Again, the raw data was model fit assuming a spherical shape and Gaussian size distribution. TEM analysis showed a slight loss of size and shape control, which can be attributed to thermal and concentration gradients associated with the larger reaction vessel required to carry out the synthesis. It is also important to note here that the slight deviation from a spherical shape will lead to an increase in the calculated size distribution from SAXS analysis. See T. Li et al., *Chem. Rev.* (2016). The same calculations as above can be used to determine the number of reversible agglomeration cycles needed to synthesize 10 g of 13.7 nm nanoparticles. $1.36 \times 10^{-5}$ kg of Fe(0) is required for each cycle, therefore the 10 g scale up reaction is the result of a minimum of 735 cycles of reversible magnetic agglomeration. The number of cycles needed was increased by more than an order of magnitude due to the reduction in overall nanoparticle size. Despite the slight loss of size and shape control, the magnetic properties of the ensemble are expected to be uniform as arresting of nanoparticle growth by magnetic agglomeration is defined by particle susceptibility, not shape.

Formation of Superparamagnetic Nanocomposite

As an example of the invention, the 15.2 nm±1.2 nm Fe/Fe$_3$O$_4$ core-shell nanoparticles formed in the 1 g reaction were used as the magnetic fraction for the formation of a matrix-free superparamagnetic nanocomposite. The nanoparticles were subjected to a ligand exchange procedure in-situ, replacing the monoamine OLA and TOP with an alkyl-diamine ligand (for example, 1,6-diaminohexane). It is expected that the amine on the surface is replaced by adsorption dynamics, whereas the TOP has previously been shown to be replaced by ligands with amine functionality. See Y. Xu et al., *Langmuir* 27, 8990 (2011). The ligand exchange procedure means the nanoparticles express an amine functionality into the environment, which is known to be reactive towards cross-linking epoxides. In addition to alkyl-diamines, higher order amines, e.g., triamines, and aromatic amines comprising at least two amine groups can also be used for ligand exchange. The aminated nanoparticles were then reacted with a triepoxy (for example, N,N-diglycidyl-4-glycidyloxyaniline) in chloroform. The solvent was subsequently removed to give a viscous, workable liquid that can be cured at elevated temperatures (e.g., 60° C.) to yield a cross-linked epoxy network characterized by covalent linkages between the magnetic nanoparticles, as shown in FIG. 1. Other epoxy compounds comprising at least two epoxide groups can also be used to form the cross-linked epoxy network. By crosslinking directly to a species that is covalently bound to the nanoparticle surface, the amount of organic fraction can be reduced substantially when compared to polymeric matrices. This allows for a significant increase in the magnetic fraction, optimizing the magnetic properties of the resulting nanocomposite. This approach also means that the interparticle spacing can be easily tuned, with the choice of alkyl chain length directly determining the distance between particles.

To confirm that the nanoparticles are undergoing a ligand exchange procedure at the surface, ex-situ experiments on the Fe/Fe$_x$O$_y$ core-shell nanoparticles were performed to mimic the conditions found during nanocomposite formation. To do this an aliquot of purified nanoparticles were reacted with a mixture of 1,6-diaminohexane in chloroform. The aminated nanoparticles were then washed thoroughly to remove any excess ligand not covalently bound to the surface of the particles. A small quantity of fluorescamine was then introduced, which is a spiro compound that forms highly fluorescent pyrrolinones upon reaction with primary and secondary amines. See H. Nakamura and Z. Tamura, *Anal. Chem.* 52, 2087 (1980); and D. Eastwood et al., *Appl. Spectrosc.* 60, 958 (2006). Following the reaction with fluorescamine the nanoparticles were washed thoroughly with hexane and methanol using magnetic separation to remove any unreacted fluorescamine. The fluorescence of the nanoparticles was then measured using a spectrofluorometer with an excitation wavelength of 390 nm. An emission peak at 468 nm was observed, which is characteristic of the as-formed pyrrolinones, clearly indicating the presence of covalently bound diamine on the surface of the nanoparticles. See M. G. Gore, *Spectrophotometry and Spectrofluorimetry: A Practical Approach,* 2nd ed.; Oxford University Press: New York, N.Y., USA. (2000).

Figure 5:
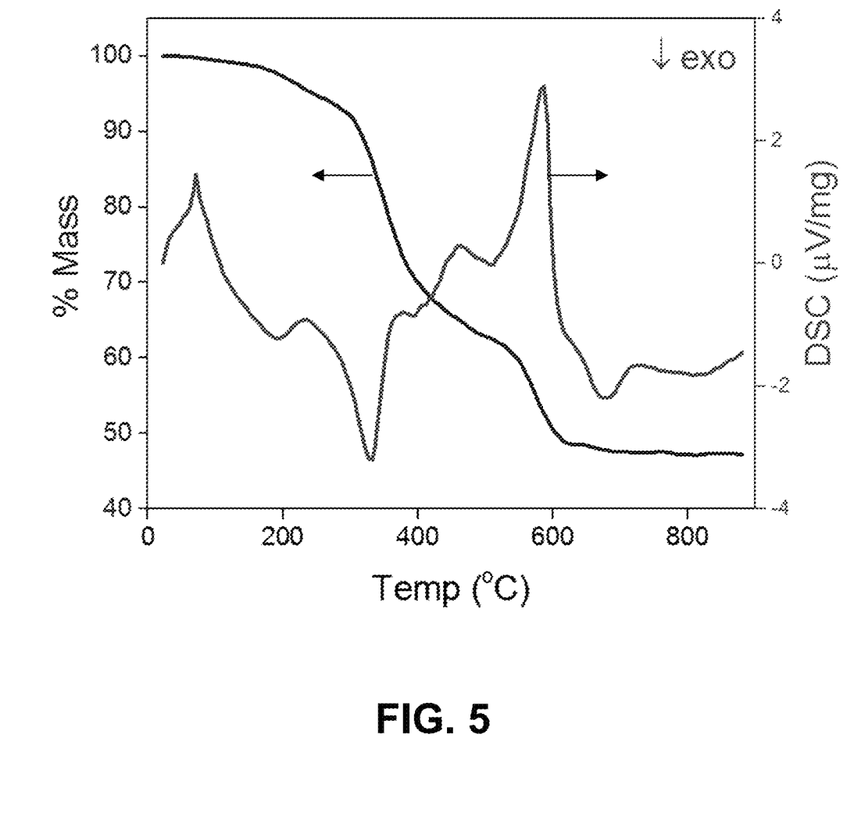
FIG. 5 is a graph of thermogravimetric analysis (TGA) and differential scanning calorimetry (DSC) analysis of the cured nanocomposite formed using 1,6-diaminohexane.

Thermogravimetric analysis (TGA) along with differential scanning calorimetry (DSC) were carried out to characterize the nanocomposite. These results are shown in FIG. 5. TGA showed that the nanocomposite possessed 62 wt. % of Fe/Fe$_x$O$_y$ nanoparticles, significantly larger than what has previously been reported for magnetic nanoparticles in an epoxy system. See J. Puig et al., *J. Phys. Chem. C* 116, 13421 (2012). This value is also significantly larger than has previously been prepared by covalent linkage to a nanoparticle surface; Mochalin incorporated up to 14 wt % of nanodiamonds into a covalently linked epoxy-amine network in a similar fashion. See V. N. Mochalin et al., *Acs Nano* 5, 7494 (2011). A number of different features corresponding to the various components that make up the nanocomposite are observed in the TGA/DSC plots. At around 210° C., an endothermic peak in the DSC is observed, which corresponds to boiling of 1,6-diaminohexane. TGA shows this fraction accounts for 7 wt. % of the nanocomposite, where the slightly higher temperature indicates this is most likely uncrosslinked diamine that is bound to the nanoparticle surface. At 300° C., a strong endothermic peak is observed in the DSC, which can be attributed to the high temperature fully completing the curing of the epoxy network. See M. Kessler, *Advanced Topics in Characterization of Composites,* 1st ed.; Trafford Publishing: Bloomington, Ind., USA (2004). This is followed by a large mass loss observed in the TGA between 300° C. and 460° C., which can be attributed to the complete removal of the organic fraction (a further 31 wt. %). From 460° C. to 620° C. a number of endothermic processes can be observed in the DSC which can be assigned to the evaporation of molecular oxygen from the oxide shell of the nanoparticles. The peak shape matches well with previous observations of iron oxide reduction in alumina. See X. Gao et al., *J. Chem. Soc., Faraday Trans.* 89, 1079 (1993). Here, the peak at 460° C., the shoulder on the peak at 600° C., and the peak at 600° C. correspond to the reduction profile; $\alpha$-Fe$_2$O$_3$→Fe$_3$O$_4$→$\alpha$-Fe. The peaks are shifted to slightly lower temperatures than previously reported due to the high curvature of the 15.2 nm nanoparticles.

Figure 6A:
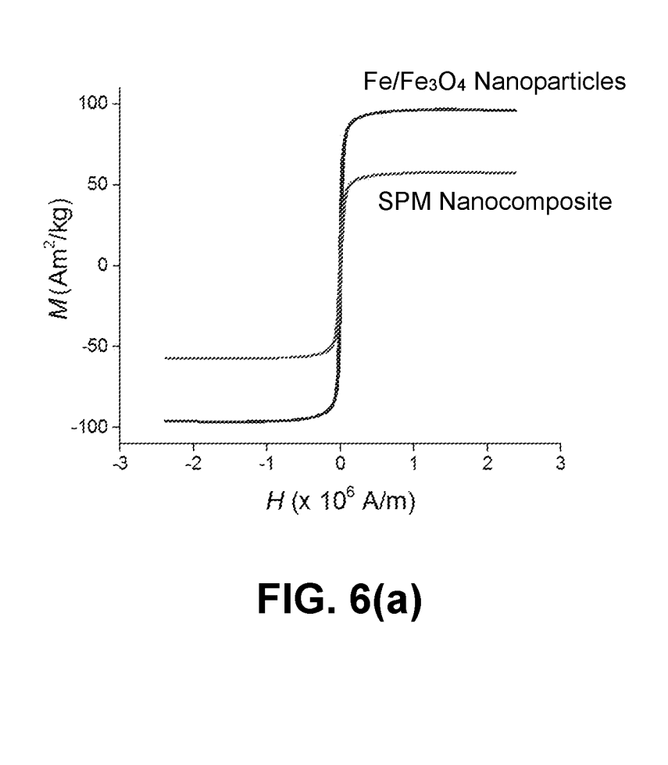
FIG. 6(a) is a plot of VSM magnetometry of the as-cured nanocomposite, compared to the as-synthesized $Fe/Fe_xO_y$ core-shell nanoparticles. The nanocomposite has an $M_{sat}$ of 58 Am²/kg, compared to 96 Am²/kg for the nanoparticles. The initial mass susceptibility has decreased from $1.0 \times 10^{-3}$ m³/kg to $5.2 \times 10^{-4}$ m³/kg.
Figure 6B:
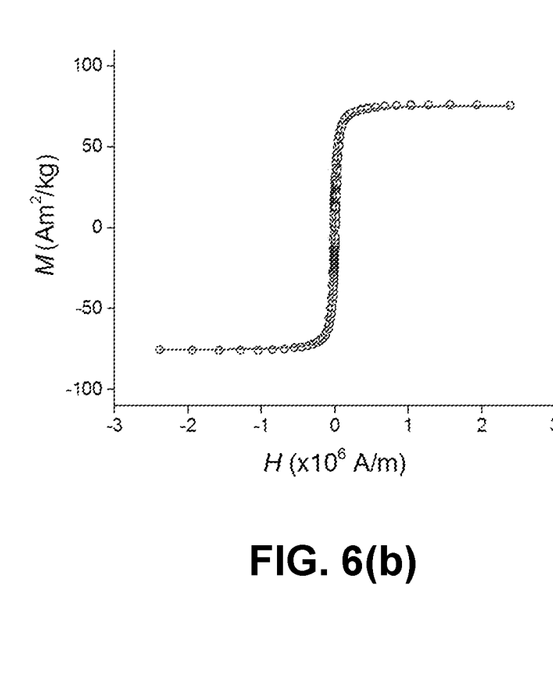
FIG. 6(b) is a graph showing $M_{sat}$ of the magnetic fraction of the nanocomposite only, giving a reduced value of 76 Am²/kg. The $M_{sat}$ curve was fit with the Langevin equation which indicates the magnetic diameter of the nanoparticles has reduced from 10.2 nm to 9.5 nm during the curing process.

The cured nanocomposite was characterized using VSM magnetometry. Saturation magnetization, M$_{sat}$, of the nanocomposite cured using 1,6-diaminohexane was measured to be 58 Am$^2$/kg at 50 K. Initial mass susceptibility of the nanocomposite was observed to reduce from 1.0×10$^{-3}$ m$^3$/kg for the Fe/Fe$_x$O$_y$ core-shell nanoparticles to 5.2×10$^{-4}$ m$^3$/kg for the cured nanocomposite. Using the known mass percentages from TGA, the saturation magnetization of the magnetic nanoparticles themselves in the cured composite can be calculated, giving a value of 76 Am$^2$/kg, as shown in FIG. 6(a). The drop in M$_{sat}$ when compared to the as-synthesized nanoparticles indicates that there has been an increase in the magnetically dead layer at the surface. This is most likely due to a further increase in the thickness of the oxide shell, although other factors may be present. Iron catalysts are known to be active in epoxide ring opening transformations, which may lead to irreversible binding at the surface of the nanoparticle and the introduction of a magnetically dead layer. See C. Bolm et al., *Chem. Rev.* 104, 6217 (2004). While the ligand shell is expected to prevent access of the epoxide to the surface, the high lability of the 1,6-diaminohexane, due to the relatively short 6 carbon chain, may allow some finite residence time. To investigate whether the magnetically dead layer increased during nanocomposite formation, the M$_{sat}$ curve was fit with the Langevin equation, as shown in FIG. 6(b). The magnetic diameter was calculated to have decreased from 10.2 nm to 9.5 nm. See M. Unni et al., *ACS Nano* 11, 2284 (2017). This indicates an increase in the thickness of the oxide shell from 2.5 nm to 2.9 nm, which also accounts for the overall reduction in initial mass susceptibility as iron oxides possess a lower susceptibility than zero-valent iron.

The interparticle spacing can be tuned by changing the length of the diamine. To investigate the influence on interparticle spacing on the magnetic properties of the superparamagnetic nanocomposite, 1,6-diaminohexane was substituted with longer alkyl chain diamines, namely 1,8-diaminooctane and 1,12-diaminododecane. Saturation magnetizations, $M_{sat}$, for the new nanocomposites were measured to be 60 $Am^2/kg$ and 62 $Am^2/kg$ for 1,8-diaminooctane and 1,12-diaminododecane, respectively. These values are similar to those observed with 1,6-diaminohexane, albeit slightly higher. The slight increase in $M_{sat}$ may be due to the lower water solubility values observed as the alkyl chain length of the diamine increases, which reduces the extent of oxidation during nanocomposite preparation.

Figure 7:
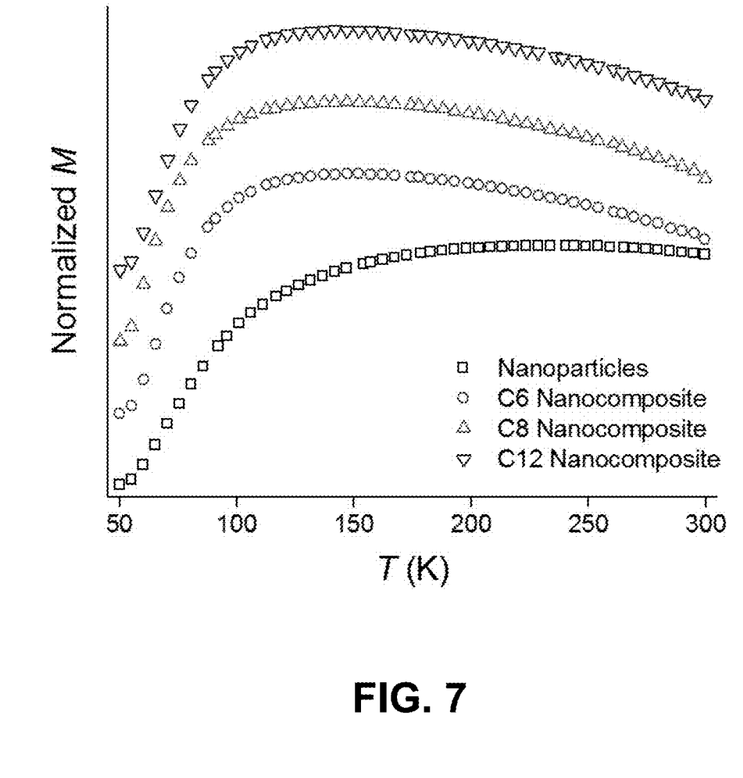
FIG. 7 are zero-field cooled curves performed using VSM magnetometry. The Fe/Fe$_x$O$_y$ nanoparticles show a broad peak with a blocking temperature, $T_B$, of 233 K indicating they are superparamagnetic at room temperature. When cured into the superparamagnetic nanocomposite, a reduction in $T_B$ to 147 K, 142 K, and 146 K is observed for nanocomposites formed using 1,6-diaminohexane, 1,8-diaminooctane, and 1,12-diaminododecane, respectively.

Zero-field cooled experiments were performed to compare the onset of superparamagnetism in the various nanocomposites, with the results shown in FIG. 7. The $Fe/Fe_xO_y$ core-shell nanoparticles possessed a blocking temperature, $T_B$=233 K. In comparison, the as-cured nanocomposites possessed blocking temperatures of $T_B$=147 K, 142 K, and 146 K for 1,6-dimainohexane, 1,8-diaminooctane, and 1,12-diaminododecane, respectively. The reduction in $T_B$ is consistent with an increase in the size of the oxide shell on the nanoparticles. The lack of variation in the blocking curves indicates that increasing the alkyl chain length from C6 to C12 still does not significantly change the particle interaction behavior. In fact, this indicates that an alkyl chain length as short as 6 carbons results in good separation of the magnetic fraction, as any magnetic interactions present in the system tends to drive $T_B$ higher. See M. Kin et al., *AIP Advances* 6, 125013 (2016). The well-defined blocking temperatures located below room temperature indicate that the nanocomposite is still superparamagnetic, and there is no evidence for the formation of ferromagnetic domains.

The present invention has been described as superparamagnetic nanoparticles and nanocomposites. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to form a matrix-free superparamagnetic nanocomposite, comprising:
   providing a plurality of superparamagnetic nanoparticles having a surfactant on the surface of the superparamagnetic nanoparticles,
   exchanging the surfactant with an amine ligand comprising at least two amine groups to provide aminated nanoparticles that express an amine functionality,
   reacting the aminated nanoparticles with an epoxy comprising at least two epoxide groups, and
   curing the epoxy-reacted nanoparticles to provide a cross-linked epoxy network of covalent linkages between the superparamagnetic nanoparticles.

2. The method of claim 1, wherein the superparamagnetic nanoparticles comprise iron, cobalt, nickel, or alloys thereof.

3. The method of claim 1, wherein the superparamagnetic nanoparticles are synthesized by a reversible agglomeration method.

4. The method of claim 1, wherein the amine ligand comprises an alkyl or aromatic amine comprising two or more amine groups.

5. The method of claim 1, wherein the amine ligand comprises a diamine or triamine.

6. The method of claim 1, wherein the amine ligand comprises an alkyl diamine.

7. The method of claim 6, wherein the alkyl diamine comprises diaminooctane or diaminododecane.

8. The method of claim 1, wherein the epoxy comprises a triepoxide.

9. The method of claim 8, wherein the triepoxide comprises N,N-diglycidyl-4-glycidyloxyaniline.

* * * * *